United States Patent [19]

Dorfman

[11] 4,353,008
[45] Oct. 5, 1982

[54] DISPLAY APPARATUS FOR A DRUM

[75] Inventor: Walter Dorfman, Warminster, Pa.

[73] Assignee: Alfred T. Moffatt, Fort Washington, Pa. ; a part interest

[21] Appl. No.: 165,961

[22] Filed: Jul. 7, 1980

[51] Int. Cl.³ .......................... H01K 7/00; H01J 7/24
[52] U.S. Cl. .................................. 315/114; 84/464 R; 315/76; 315/112; 340/815.17
[58] Field of Search ......................... 315/76, 112, 114; 344/DIG. 5, 366 B, 148; 84/464, 464 A, 411 R

[56] References Cited

U.S. PATENT DOCUMENTS

| | | |
|---|---|---|
| D. 163,538 | 5/1949 | Orta . |
| 1,044,950 | 10/1912 | Uptegraff ............................ 315/114 |
| 3,228,278 | 1/1966 | Wortman ............................ 340/148 |
| 3,324,755 | 6/1967 | Canonico ......................... 84/464 A |
| 3,500,126 | 3/1970 | Ford . |
| 3,550,497 | 12/1970 | Marsh . |
| 3,635,121 | 1/1972 | Knauff . |
| 3,719,857 | 3/1973 | Sharp . |
| 3,798,638 | 3/1974 | Goldschmied . |
| 3,958,113 | 5/1976 | Termohlen ....................... 84/464 A |
| 4,091,706 | 5/1978 | Ludwig ............................ 84/464 A |
| 4,216,464 | 8/1980 | Terry .................................. 340/148 |

*Primary Examiner*—Harold A. Dixon
*Attorney, Agent, or Firm*—Finnegan, Henderson, Farabow, Garrett and Dunner

[57] ABSTRACT

A display apparatus is provided which is responsive to an audio signal to vary the illumination of a light source. The light source has a variable resistance having an initial value when the light source is cold and a larger value when the light source is warm. The display apparatus includes a circuit having a pulse generator which periodically passes pulses of current through the light source to warm the light source prior to illumination of the light source by the modulator sufficient to substantially increase the response time of the light source upon receipt of the audio signal.

13 Claims, 9 Drawing Figures

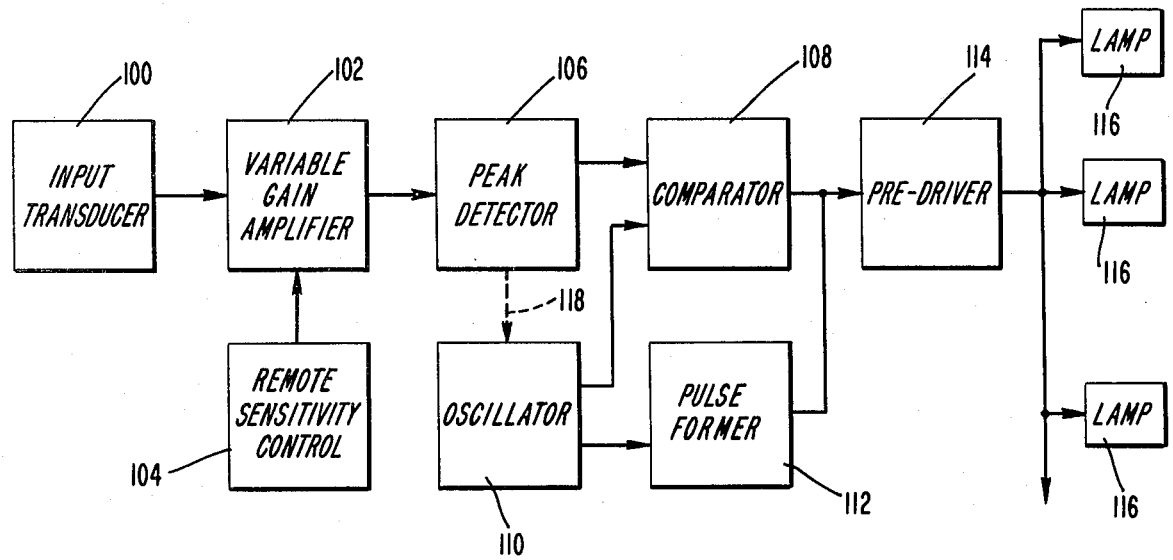
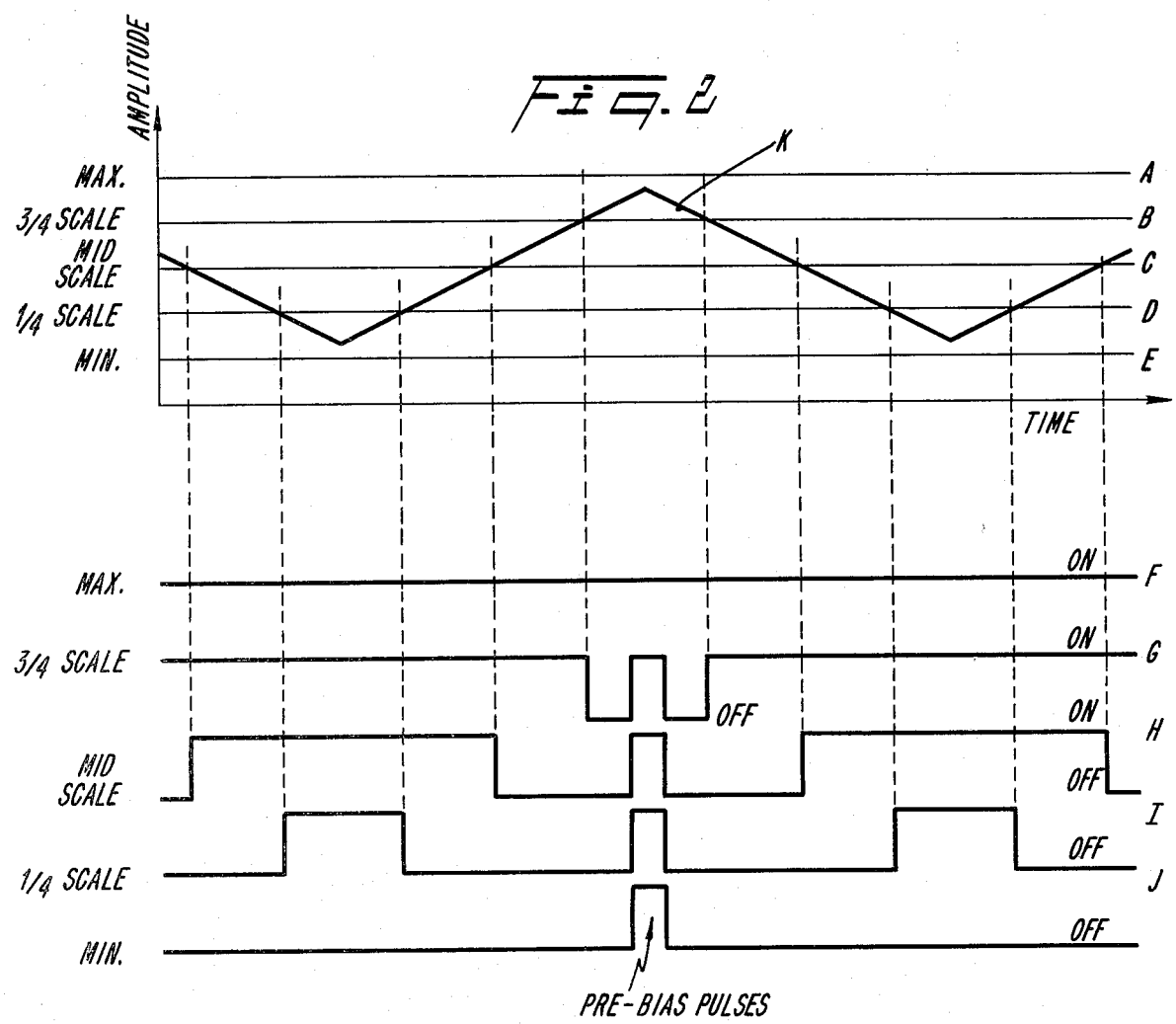

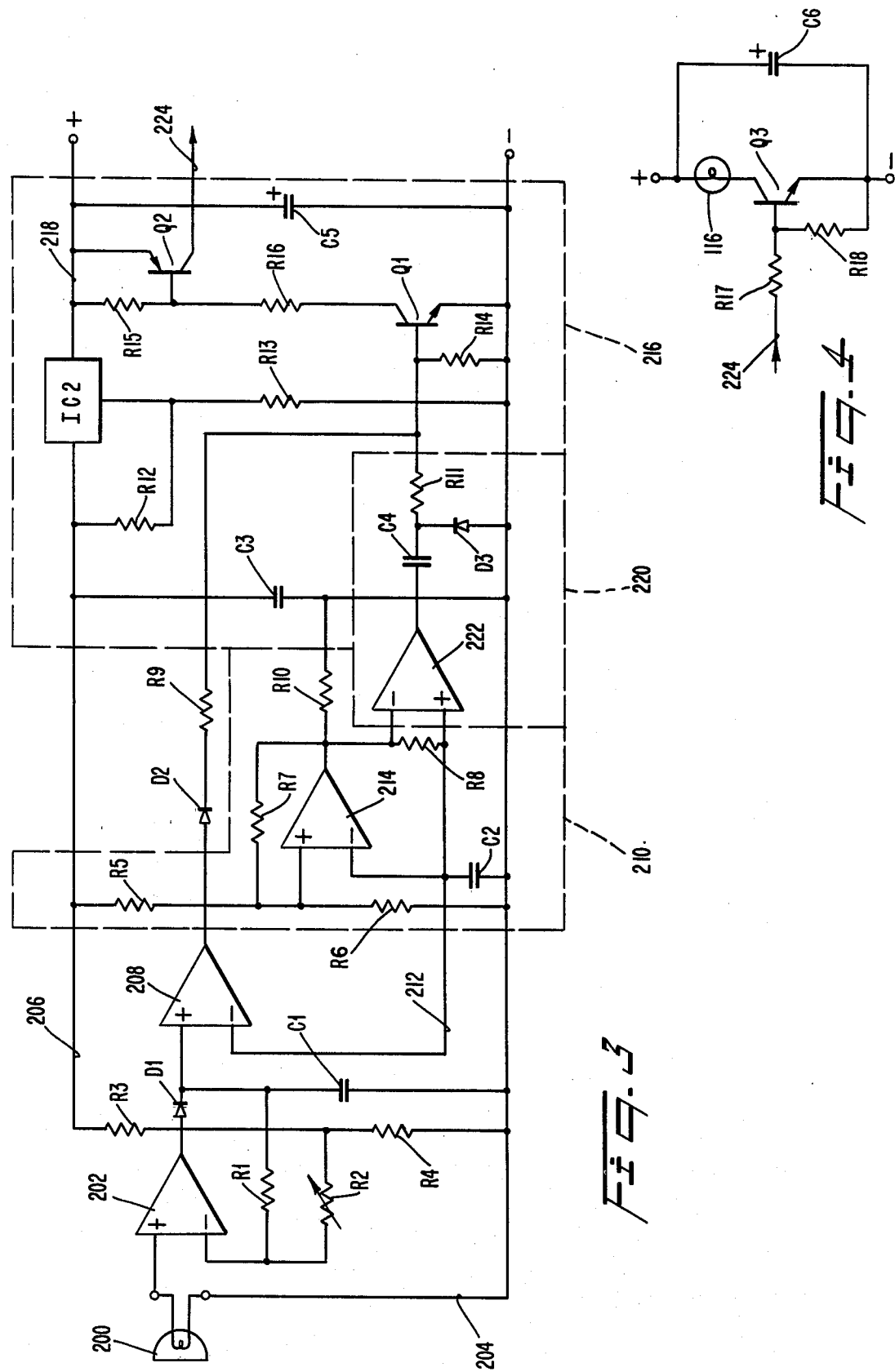

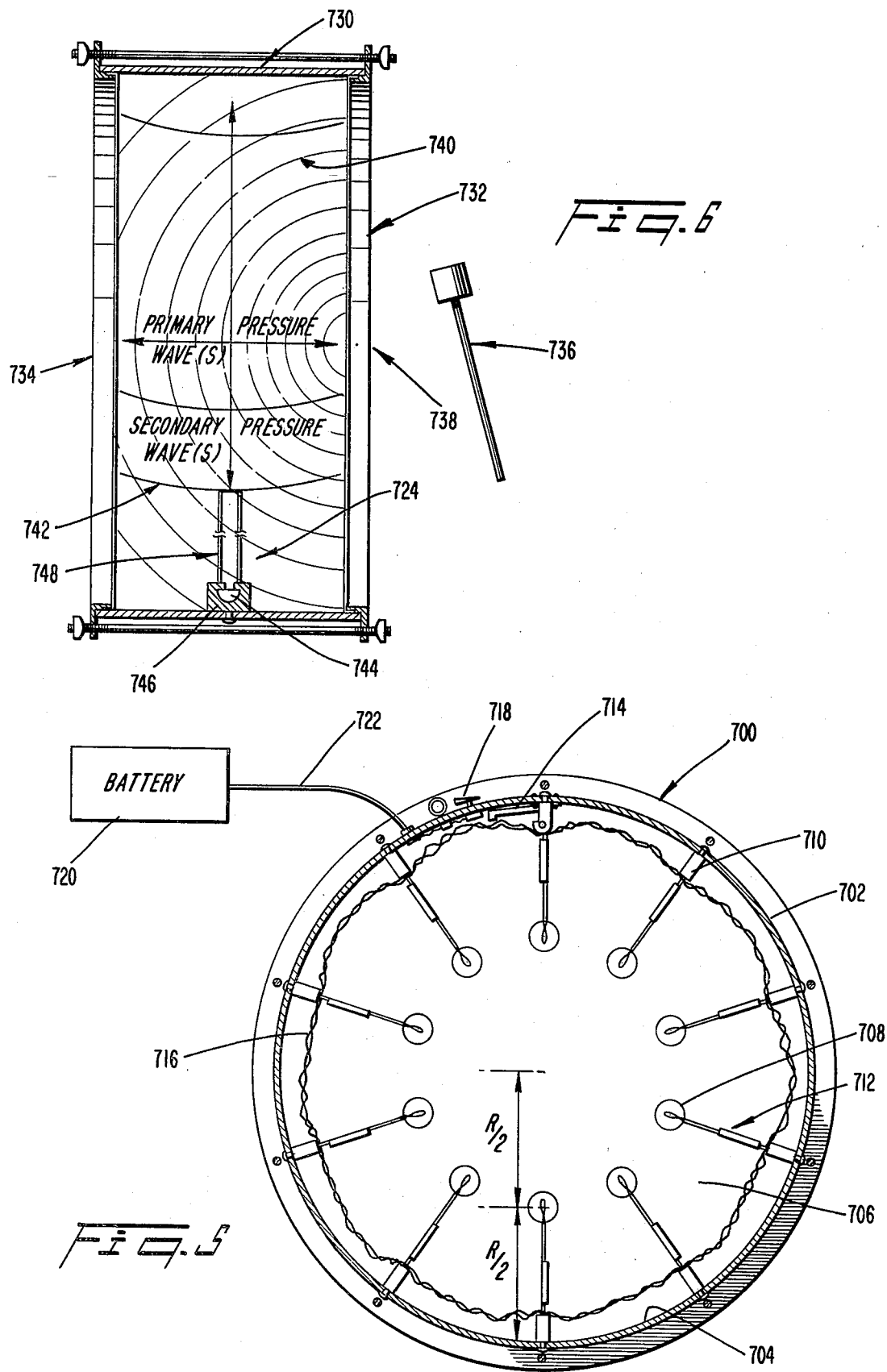

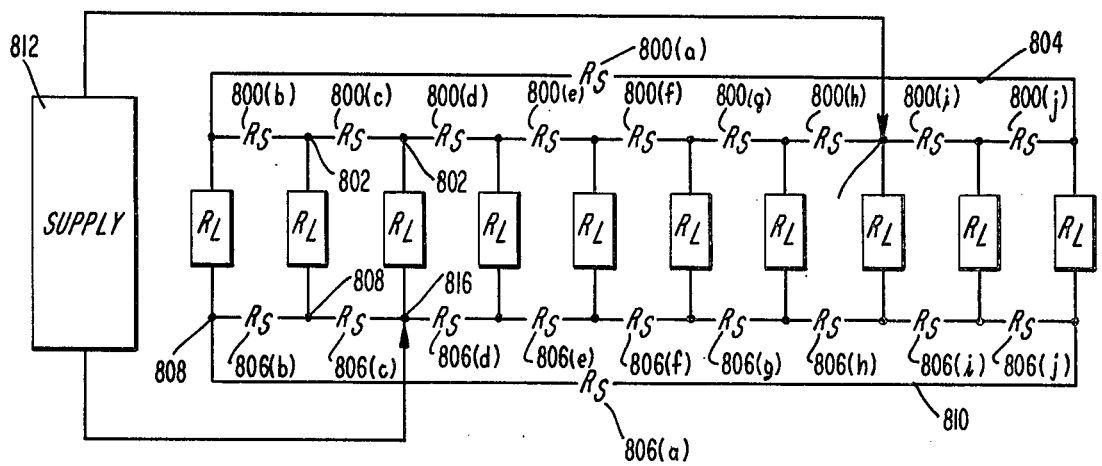
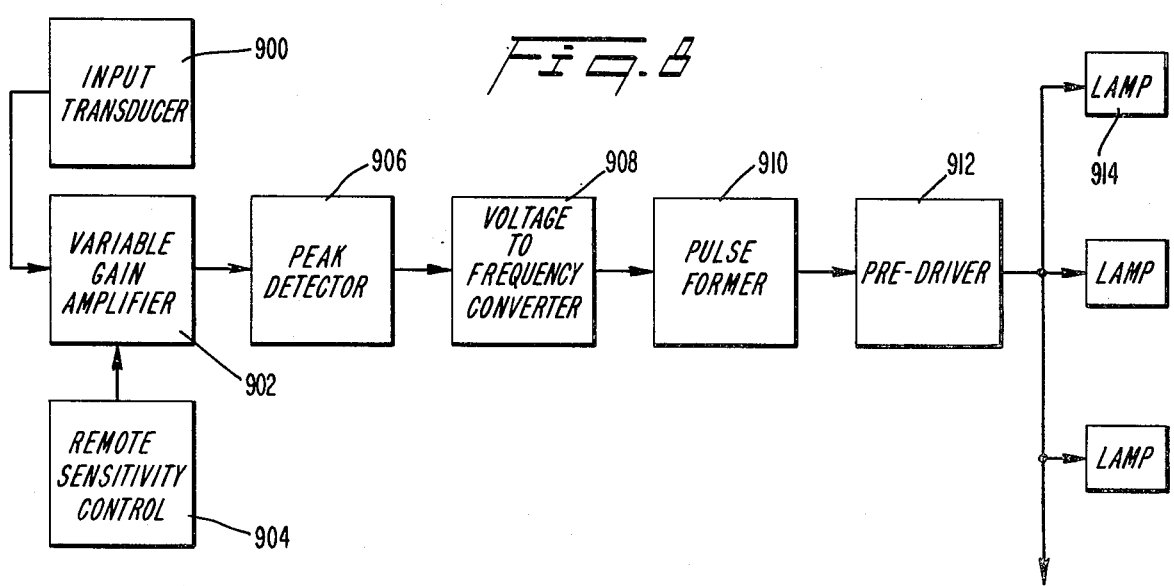
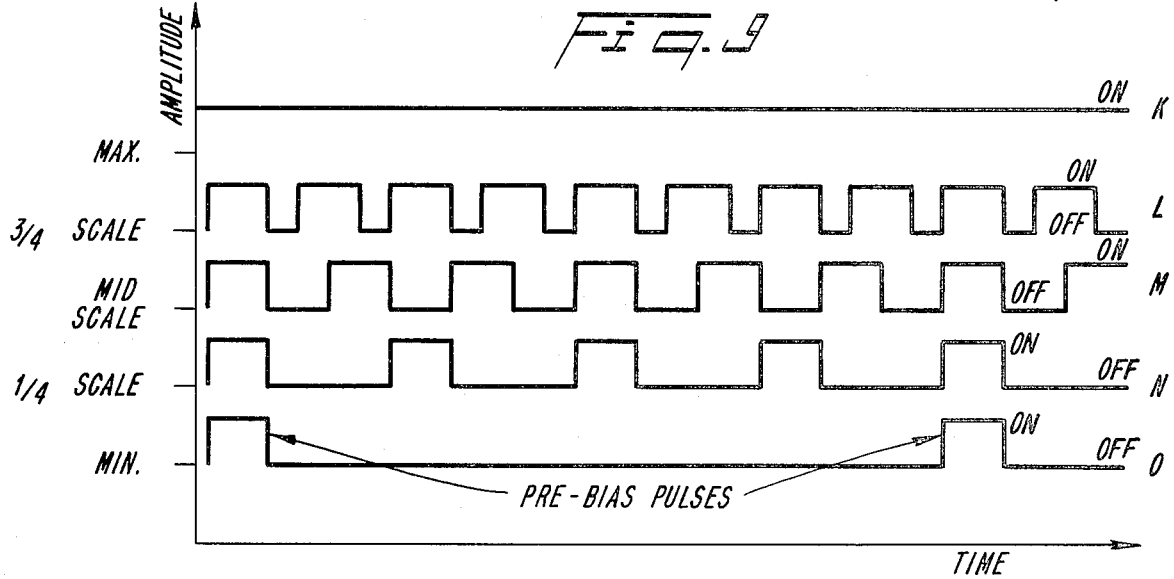

DISPLAY APPARATUS FOR A DRUM

BACKGROUND OF THE INVENTION

I. Field of the Invention

The present invention relates to apparatus for providing a visual display responsive to an audio signal.

Such devices add visual reenforcement to an audio performance. It is an object of the present invention to provide such a display apparatus which is suitable for use in percussion sections of marching bands, thereby visually enhancing the appearance and appreciation of these percussion sections. The present invention is particularly useful in connection with drums in a percussion section whose intricate patterns are often lost in the totality of the band's complete arrangement. Furthermore, since many marching bands of today compete against each other, there is a need to be able to elicit a noticeably increased response from the viewing audience and impress the judges so as to increase the band's chances for obtaining the top score in competition.

The present invention, therefore, has as an object the ability to visually display the various combination of patterns, beats, and rhythms being played by the percussion section, thereby adding visual reenforcement to what the audience and judges are hearing.

II. Description of the Prior Art

To fulfill this identified need, a display device requires the ability to instantaneously respond to very rapid changes in the amplitude of audio signals generated by a percussion section of a band. Prior art display devices, such as that disclosed in U.S. Pat. No. 3,719,857 issued to Sharp, recognized that incandescent lamps have an inherent slow response time and, hence, appear unable to achieve the very rapid light intensity modulation required for such visual displays. As explained in Sharp, the slow response of incandescent lamps causes their brightness to remain more or less constant while important short term musical effects are occurring. The resultant optical display of such prior art devices is, therefore, of limited interest.

Accordingly, Sharp turns to the use of fluorescent, ultraviolet or other gas discharge devices to facilitate very rapid intensity modulation in response to an audio signal.

However, gas discharge lamps require large power sources and are, accordingly, unsuited for portable operation. In fact, even incandescent display devices suffer from relatively high current drain requirements, thereby severely limiting how long such devices can operate without replacing or recharging the required portable power supply. U.S. Pat. No. 3,798,638 issued to Goldschmied attempts to minimize such high current drain by driving an incandescent lamp through a current limiting transistor at nominal rating until maximum illumination intensity of the incandescent lamps is reached. This approach, however, risks burn-out of the lamps in the event that intensity is not timely reduced, requires a sophisticated control to assure reduction of intensity, and, subjects the lamps to an extremely high initial current draw or inrush current upon application of the voltage. Furthermore, the current limiting transistor is power consuming and prevents maximum utilization of available voltage.

It is, accordingly, an object of the present invention to provide a display apparatus which exhibits a visually attractive light reenforcement to accompany sound output of a percussion instrument such as a drum.

Another object of the present invention is to provide such a display apparatus wherein the relative intensity of the light output is proportional to the relative intensity of the sound output, with the periodicity of the light output being in step with the periodicity of the sound output.

A further object of the present invention is to provide such a visual display which has a minimum power requirement and, accordingly, may be portably operated. Preferably, the display may be portably operated for at least 15 minutes of normal playing time.

It is also an object of the present invention to provide such a display system which is ruggedly constructed, so as to withstand relatively severe shock, vibrations, and general abuse, which is normal and common to occur to the types of instruments into which this system is intended to be installed.

A still further object of the present invention is to provide such a display system so designed and constructed as to facilitate its installation into both new instruments at the factory level and into old instruments already in the field, by personnel having a minimum of mechanical aptitude and utilizing generally available tools.

Furthermore, it is still another object of the present invention to provide such a display system which is reasonably priced.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a display apparatus is provided which comprises: (a) a light source having a variable resistance, the resistance having an initial value when the light source is cold and a larger value when the light source is warm; (b) modulator means responsive to the audio signal for controlling the illumination of the light source; and (c) circuit means for warming the light source prior to the illumination of the light source by the modulator means sufficient to increase the resistance above the initial value.

Preferably the circuit means includes a pulse generator means for periodically passing pulses of current through the light source. The pulses of current are preferably of sufficiently short duration to preclude visually discernable illumination of the light source by a viewing audience, although careful inspection of the light sources can reveal a slight glow which confirms positive operation of the light source. The circuit means may, in a preferred embodiment, be activated by the audio signal.

In a preferred embodiment, the modulator means is responsive to the amplitude of the audio signal. The modulator means may, in such an embodiment, include (i) a signal generator providing a variable reference signal; (ii) detector means for providing an audio peak signal which varies as a function of the peak amplitudes of the audio signal; and, (iii) comparator means responsive to the instantaneous relative amplitudes of the variable reference signal and the audio peak signal for driving the light source.

In a more narrow sense, applicant provides a display apparatus comprising: (a) a drum; (b) an incandescent light source mounted on the drum and having an initial value resistance when the light source is cold; (c) modulator means mounted on the drum and responsive to playing of the drum for controlling the illumination of the light source; (d) circuit means mounted on the drum for decreasing the initial current draw of the light source upon illumination of the light source in response to the modulator means by increasing the resistance of the light source above the initial value prior to the illumination of the light source; and (e) a power source for the light source, modulator means, and circuit means mounted on the drum to render the display apparatus of applicant's invention portable.

Preferably, the drum comprises a cylindrical drum shell having two open ends and two drum heads parallel positioned one on each end of said drum and, preferably the modulator means includes a pick-up having a maximum response direction and the pick-up is mounted on the inside wall of the drum shell with the maximum response direction oriented to receive secondary pressure waves within the drum shell generated by the reflection of primary pressure waves off the inside wall of the drum shell.

Each of the above summarized examples of applicant's invention may include a plurality of light sources. Preferably, in such an embodiment, there are also included (a) first and second conductive loops, with the light sources being coupled in parallel to one another between the first and second loops and being coupled to each loop at individual nodes with substantially equal resistance between adjacent nodes; and (b) a power supply coupled to the first and second loops at respective first and second points, which first and second points lie at the ends, respectively, of current paths for each of the light sources, with each current path having substantially the same resistance.

BRIEF DESCRIPTION OF THE DRAWINGS

The accompanying drawings, which are incorporated and constitute a part of this specification, illustrate a preferred embodiment of the invention and, together with the general description of the invention given above and the detailed description of the preferred embodiments given below, serve to explain the principles of the invention.

FIG. 1 is a block diagram of an apparatus incorporating the teachings of the present invention;

FIG. 2 is a graph depicting the operation of the apparatus illustrated in FIG. 1;

FIG. 3 is a schematic diagram of one example of an apparatus employing the teachings of the present invention as illustrated in FIG. 1;

FIG. 4 is a schematic diagram of a circuit for driving light sources in accordance with the teachings of the present invention;

FIG. 5 illustrates a drum incorporating the teachings of the present invention;

FIG. 6 illustrates the preferred orientation of a pick-up within the drum illustrated in FIG. 5.

FIG. 7 is a schematic diagram of one example of a circuit connecting plural light sources in accordance with the teachings of the present invention;

FIG. 8 is a block diagram of another example of the present invention;

FIG. 9 is a graph illustrating the operation of the example of the present invention illustrated in FIG. 8.

The above general description and the following detailed description are merely illustrative of the generic invention, and additional modes, advantages, and particulars of this invention will be readily suggested to those skilled in the art without departing from the spirit or scope of the invention.

DESCRIPTION OF THE PREFERRED EMBODIMENTS

Reference will now be made in detail to the present preferred embodiments of the invention as illustrated in the accompanying drawings.

In FIG. 1 there is illustrated a block diagram of one example of a display apparatus incorporating the general teachings of the present invention. The apparatus of FIG. 1 comprises an input transducer 100, a variable gain amplifier 102, a remote sensitivity control 104, a peak detector 106, a comparator 108, an oscillator 110, a pulse former 112, a pre-driver 114, and lamps 116.

Input transducer 100 may preferably comprise any one of many available sound pressure to voltage/current converters, consistent with the sound pressures expected to be encountered in the specific application of the displayed device.

As illustrated in FIG. 1, the output of transducer 100 is coupled to the input of variable gain amplifier 102. Remote sensitivity control 104 is also coupled to an input of variable gain amplifier 102. It is preferable that variable gain amplifier 102 provide an output voltage amplified by an operator variable factor from a low of approximately 10 times the input signal from transducer 100 to a high of approximately 3,000 times the input signal from transducer 100. Variable gain amplifier 102 may, for example, comprise an operational amplifier and remote sensitivity control 104 may, for example, comprise a variable control to that operational amplifier.

As is further illustrated in FIG. 1, the output of variable gain amplifier 102 is coupled to an input of peak detector 106. An output of peak detector 106 is coupled to a first input of comparator 108. An oscillator 110 provides a second input to comparator 108. Oscillator 110 also provides an input to pulse former 112. The output of comparator 108 and pulse former 112 are joined in pre-driver 114 and the output of pre-driver 114 is coupled to lamps 116.

In general, peak detector 106, comparator 108, and pre-driver 114 provide one example of modulator means responsive to an audio signal for controlling the illumination of lamps 116.

Specifically, the output from variable gain amplifier 102 which represents the instantaneous amplitude detected by transducer 100, is introduced to peak detector 106. Peak detector 106 operates, as is well-known to those skilled in the art, to provide an audio peak signal which varies as a function of the peak amplitude of the audio signal from amplifier 102. The audio peak signal from peak detector 106 is coupled to a first input of comparator 108.

The need for peak detector 106 was revealed by the discovery that the time and duration of rather light and sharp drum head impacts were too short to allow the eye of an observer to adequately perceive a lamp intensity response in the absence of peak detector 106. This problem was solved by the inclusion of peak detector 106 which achieves, in effect, an integration of the input audio signal, the purpose of which is to fill in the spaces or time between fast vibrational peaks, effectively stretching them out in time to a more perceptive portion of the human eye and brain's psychological response.

As stated above, oscillator 110 provides a second input to comparator 108. Oscillator 110 operates to generate a variable reference signal for comparator 108. Preferably, the variable reference signal generated by oscillator 110 takes the form of a triangular waveform, although the variable reference signal could also take other forms including a traditional sinusoidal waveform. When producing a repetitive waveform, such as a triangular waveform, oscillator 110 preferably comprises a symmetrical oscillator, operating at a repetition rate faster than 17 milliseconds.

The resultant variable reference signal delivered to comparator 108 has a maximum output designed to be less then the maximum output obtained from peak detector 106. The reason for this relationship of amplitudes is to assure that the audio peak signal from peak detector 106 exceeds the variable reference signal for continuous high input amplitude audio signals.

Furthermore, the minimum amplitude of the variable reference signal from oscillator 110 is chosen to have a value which exceeds the magnitude of the audio peak signal from peak detector 106 in the absence of operation of the instrument to which input transducer 100 is attached. Accordingly, there is provided a lower threshold area that must be overcome before the audio peak signal can possibly exceed the variable reference signal, thereby providing a protective off-zone not encroached upon by reasonable levels of extraneous sound inputs or circuit noise.

Comparator 108 operates responsive to the instantaneous relative amplitudes of the variable reference signals from oscillator 110 and the audio peak signal from peak detector 106 to provide an output signal to pre-driver 114.

The operation of comparator 108 may be better understood with reference to the graphs in FIG. 2. Lines A, B, C, D and E represent audio peak signals from peak detector 106 at maximum amplitude, three-quarters amplitude, mid-amplitude, one-quarter amplitude, and minimum amplitude, respectively. Line K represents a triangular waveform variable reference signal from oscillator 110. When the amplitude of the audio peak signal from peak detector 106 exceeds the amplitude of the variable reference signal from oscillator 110, comparator 108 generates an ON signal for pre-driver 114. However, when the amplitude of the audio peak signal from peak detector 106 is less then the amplitude of the variable reference signal from oscillator 110, comparator 108 generates an OFF signal for receipt by pre-driver 114.

Thus, in FIG. 2, line F represents the output of comparator 108 when peak amplitude signal A from peak detector 106 is at a maximum and, thus, comparator 108 is continuously ON. Line G represents the output of comparator 108 when the audio peaks signal assumes a three-quarters scale amplitude as represented by line B. Line H represents the output of comparator 108 when the audio peak signal from peak detector 106 assumes a mid-scale amplitude represented by line C. Line I represents the output of comparator 108 when the audio peak signal from peak detector 106 assumes a one-quarter amplitude scale as illustrated by line D, and line J represents the output of comparator 108 when the audio peak signal from peak detector 106 assumes the minimum amplitude value as illustrated by line E in FIG. 2.

The output of comparator 108, accordingly, is either all ON for very strong impacts or loud sounds and is all OFF for extraneously generated sounds or noises or the output of comparator 108 is a series of pulses whose ON-time to OFF-time ratio is a direct function of the input level provided by peak detector 106.

Lamps 116 are incandescent light sources having a variable resistance, with the resistance of the light source having an initial value when the light source is cold and a larger value when the light source is warm.

In order to obtain the necessary periodicity of light output response from lamps 116 in direct proportion to the periodicity of the sound output from input transducer 100, lamps 116 must have a chosen frequency response or an ability to follow and respond to input current/voltage variations. As might be expected, higher voltage and lower power lamps, with their thinner and less rugged filament structures, with all other things being equal, exhibited the fastest response times.

To maintain power and switching losses to a minimum, lamps 116 are preferably chosen to have a rated capacity of 12 volts.

With a nominal quantity of about ten lamps 116 capable of being accommodated, lamp types numbers 1003 and 1004 are preferable. These lamps are rugged automobile types, nominally rated at 12.8 volts at 0.94 amps and 15 candlepower. These lamps are nonfrosted bulbs and translate a ten lamp output to 1512 lumens, which closely approximates an 150 watt level, which was determined to be a preferred level-intensity for use in the drums of a marching band.

It was discovered by the inventor, when testing such lamps, that a normally lit lamp when powered by a 12.8 volt source has a current drain of 0.9 amperes and, therefore, has a resistance of 14.22 ohms. However, when not lit, or cold, the filament resistance of such a lamp was only about 0.85 ohms. Thus for ten lamps, this translates into an initial current draw or inrush current of about 150 amperes, which could go as high as 175 amperes when manufacturing tolerances are considered. No reasonable battery, wiring technique, or lamp switching device could be expected to handle currents of these magnitudes within the physical and cost restraints which the subject invention requires. Additionally, frequency response tests on such lamps indicated a marginally acceptable performance.

Faced with these difficulties, the inventor devised a circuit means for warming the light source of the present invention prior to illumination of the light source by a modulator means sufficient to increase the resistance of the light source above an initial cold value of that light source. By increasing the resistance of the light source above an initial value prior to illumination of the light source by the modulator, the circuit means both substantially decreased the initial current draw of the light source upon illumination, and also substantially improved the response time of the light sources. In a specific preferred embodiment, the circuit means includes a pulse generator means for periodically passing pulses of current through the light sources. The pulses of current are, preferably, of sufficiently short duration to preclude visually discernable illumination of the light source by a viewing audience, although careful inspection of the light sources can reveal a slight glow which confirms positive operation of the light sources. The term "visually discernable illumination" is, accordingly used hereinafter to mean as perceived by a viewing audience, and is not intended to preclude a slight glow which may be detectable upon careful inspection.

By utilizing such a pulse generator means in the form of a hard ON-OFF switch in series with lamps 116 and their power source, dissipation and consequent power losses are held to an absolute minimum level.

In a series of subjective tests, it was determined that driving the lamps 116 on and off every 17 milliseconds, at a 50% duty cycle, was just beyond the flicker detection threshold of the average viewer. Maintaining this 17 milliseconds combinational repetition rate or cycle time of total switching action, the ratio of ON time to OFF time was varied and resulted in a smoothly varying perceived intensity control of the lamp as interpreted by the viewer. To provide operating margins, repetition rates faster then every 17 milliseconds can also be utilized.

As illustratively shown in FIG. 1, pulse former 112 is coupled between oscillator 110 and pre-driver 114 to provide a circuit means for warming lamps 116 prior to illumination of lamps 116 by the operation of comparator 108, sufficiently to increase the resistance of lamps 116 above an initial value and thereby substantially decrease the initial current draw of lamps 116 upon illumination of lamps 116 through the operation of comparator 108. Specifically, pulse former 112 produces pre-bias pulses as illustrated in FIG. 2 on a continuous repetition rate determined by the output of oscillator 110. The width of the pre-bias pulses is determined by the operation of pulse former 112.

In the absence of an audio signal sufficient to turn on comparator 108, lamps 116 are periodically turned on by pulse former 112 sufficiently to warm lamps 116 and hold lamps 116 to a just lit but visually OFF condition, thereby maximizing the response time of lamps 116 to normal drive by comparator 108, while minimizing the full turn-on surge currents required from a power source connected to lamps 116.

The embodiment of the present invention illustrated in FIG. 1, when turned ON, but not purposely responding with light output from lamps 116 in response to sound input at input transducer 100, draws quiescent current of about 0.4 amps from a battery source. This quiescent current is mainly used to pre-bias lamps 116 as explained above into a higher resistive region so as to limit their inrush current requirements, while additionally enhancing the frequency response characterestics of lamps 116.

However, additional circuitry could be easily devised by those skilled in the art to automatically sound actate the initiation of the generation of the quiescent current, incorporating a delayed turn-OFF of about 15 seconds. For example, an output from peak detector 106 illustrated in FIG. 1 by dotted line 118 may be employed to activate oscillator 110 and subsequent circuitry only upon receipt of an audio input signal at transducer 100 which exceeds a predetermined level. This activating signal on line 118 may, for example, be maintained for a predetermined period of time to provide a suitable delay, and thereafter be removed to deactivate oscillator 110 and subsequent circuitry until a subsequent audio input was received at transducer 100.

This additional feature would reduce the present nominal 0.4 amps, OFF circuit drain down to an insignificant few milliamps. Based on the prevailing conditions of anticipated use, battery life would thus be additionally extended significantly.

For a 14 lamp system, the battery rating required to provide a desired 15 minutes of normal playing time was determined to be 3.6 amperes hours at a 15 minute rate. Consistent with accounting for numerous degrading factors, such as but not limited to temperature, age, and charge level, the minimum recommended battery rating requirement is 8.0 ampere hours at a 20 hour industrial standard rate. In addition, the selected battery should also have a safe peak current rating of at least 60 amperes, to be able to adequately supply the starting surge currents, so as not to introduce excessive terminal voltage drops.

A 10 lamp system could use a battery rated at 6.0 amperes hours at a 20 hour rate, with a 40 ampere surge current capability.

Although many different types of batteries may be used, it is preferable that a sealed lead-acid battery be employed.

FIG. 3 illustrates a circuit diagram of one illustrative example of the embodiment of the present invention shown generally in FIG. 1. In FIG. 3 a microphone pick-up 200 is coupled between a non-inverting input of amplifier 202 and a negative supply bus 204. An inverting input terminal of amplifier 202 is coupled through the series combination of variable resistor R2 and fixed resistor R3 to a positive supply bus 206. The junction of resistors R2 and R3 is coupled by resistor R4 to negative bus 204. The output of amplifier 202 is coupled to the inverting input terminal of amplifier 202 by the series combination of diode D1 and resistor R1.

Amplifier 202, accordingly, is connected as a variable gain amplifier with resistor R2 providing a remote sensitivity control.

The rectified output of diode D1 is coupled by capacitor C1 to negative bus 204 and is also connected to the non-inverting input of amplifier 208. As those skilled in the art would recognize, the combination of diode D1, capacitor C1, and resistor R1 comprises a peak detector in which the rectified output of diode D1 follows rises in the output of amplifier 202. The voltage across capacitor C1 tends to retain the highest value achieved while the amplified output signal from amplifier 202 is lower. The voltage across capacitor C1 ultimately decays due to the time constant of resistor R1 and capacitor C1, thus providing a rectified output at diode D1 representing the peaks of output amplifier 202.

Amplifier 208 operates as a comparator and compares the output of amplifier 202 which passes through diode D1 with an output of oscillator 210 generated over line 212 and coupled to the inverting input of amplifier 208.

Oscillator 210, as illustrated in FIG. 3 comprises amplifier 214, resistors R5, R6, R7, R8, and R10 and capacitor C2. Resistors R5 and R6 are series coupled between buses 206 and 204. The junction of resistors R5 and R6 is coupled to the non-inverting input of amplifier 214. Resistor R7 couples the output of the amplifier 214 to the non-inverting input of amplifier 214, while resistor R8 couples the output of amplifier 214 to the inverting input of amplifier 214. Line 212 couples the output of amplifier 214 as received through resistor R8 to the non-inverting input of amplifier 208. The output of amplifier 214 is also coupled to negative bus 204 through resistor R10. The inverting input terminal of amplifier 214 is coupled to negative bus 204 through capacitor C2.

The operation of oscillator 210, as is well-known to those skilled in the art, provides a symmetrical square waveform at the output of amplifier 214 and a symmetrical triangular waveform over line 212. Resistors R5 and R6 simply constitute a voltage divider to bias amplifier 214 at the non-inverting terminal. Resistor R7 provides positive gain so as to cause oscillation.

With oscillator 210 providing a variable reference signal over line 212 to one input of amplifier 208, and the combination of diode D1 and capacitor C1 providing an audio peak signal which varies as a function of the peak amplitude of the audio signal detected by microphone pick-up 200, amplifier 208 operates as a comparator of the instantaneous relative amplitudes of the variable reference signal and the audio peak signal.

The output of amplifier 208 is coupled by the series connection of diode D and resistor R9 to the input of a pre-driver 216.

As illustrated in FIG. 3, pre-driver 216 comprises transistors Q1 and Q2, resistors R12, R13, R14, R15 and R16, capacitors C3 and C5, and a voltage regulator IC2.

Diode D2 and resistor R9 couple the output of amplifier 208 to the base of transistor Q1. The emitter of transistor Q1 is coupled to negative bus 204 whereas the collector is connected to supplemental bus 218 by the series combination of resistors R15 and R16. The base of transistor Q1 is also coupled to negative bus 204 through resistor R14. The base of transistor Q2 is coupled to the junction of resistors R15 and R16, whereas the emitter of transistor Q2 is connected to supplemental bus 218. The collector of transistor Q2 provides a drive signal to lamps 116 over line 224 as will be discussed below.

Voltage regulator IC2 of FIG. 3 isolates lamp switching current power supplied on positive bus 206 from the display apparatus power supply on supplemental bus 218. Maximum supply voltage on bus 206 is governed by the output of IC2 while the input to IC2 is an unregulated supply provided by a 12 volt battery not shown. A capacitor C5 is coupled between supplemental bus 218 and negative bus 204 to smooth out any switching surges appearing on buses 218 and 204.

Resistors R12 and R13 are series coupled between buses 206 and 204, and the junction of resistors R12 and R13 is coupled to bias voltage regulator IC2 as is known to those skilled in the art. A capacitor C3 is also coupled between buses 206 and 204. Capacitor C3 is provided to assist IC2 in maintaining a regulated output and is employed to smooth out any switching surges appearing on buses 206 and 204.

A pulse former circuit 220 is illustrated in FIG. 3 as comprising amplifier 222, capacitor C4, diode D3, and resistor R11. The inverting input of amplifier 222 is coupled directly to the squarewave output of amplifier 214 while the inverting input of amplifier 214, which receives a triangular waveform, is coupled directly to the non-inverting input of amplifier 222. The output of amplifier 222 is coupled through the series combination of capacitor C4 and resistor R11 to the base of transistor Q1 of pre-driver circuit 216. The junction of capacitor C4 and resistor R11 is connected to negative bus 204 by diode D3.

In the operation of pulse former 220, amplifier 222 acts as a buffer so that capacitor C4 does not alter the operation of oscillator 210. Capacitor C4 passes along any changes in the output from amplifier 222 as spikes or pulses and diode D3 allows only positive pulses to be introduced by resistor R11 to pre-driver 216.

The signal produced by pulse former 220 is in effect a warming signal which is coupled with the output of comparator 208 to the base of transistor Q1 of pre-driver 216. Pre-driver 216 acts in response to the signal appearing at the base of transistor Q1 to provide a control signal, as is well-known to those skilled in the art, at the collector of transistor Q2 over line 224.

FIG. 4 illustrates a schematic diagram of a suitable switching circuit for lamps 116. Specifically, a lamp 116 is shown in FIG. 4 coupled in series with the emitter-collector path of a transistor Q3 connected between positive and negative power source terminals. A capacitor C6 is shown shunting the series combination of lamp 116 and transistor Q3. A resistor R18 is coupled between the base of transistor Q3 and the negative power source terminal whereas a resistor R17 is coupled to the base of transistor Q3 for receipt of a control signal over line 224. As stated above, the signal on line 224 represents the output of a pre-driver circuit connected in accordance with the teachings of the subject invention. Accordingly, the signals appearing on line 224 may be considered identical to those signals represented by lines F, G, H, I and J of FIG. 2.

FIG. 5 illustrates a preferred application of the teachings of the present invention to a bass drum. In FIG. 5, a bass drum 700 is shown to include a drum shell 702, a reflective surface 704, and drum heads 706 of which only one is illustrated. Diffuse drum heads, except for specially desired effects, have been found to present a more pleasing and acceptable appearance than clear drum heads.

A uniform drum head illumination is most desirable from an appearance standpoint, with some favoritism being exhibited for a slight center brightness tendency. Accordingly, a plurality of lamps 708, acting as points sources, are preferably positioned uniformly and circumferentially displaced on a 0.5 (R) radius of drum head 706. To provide a desirable degree of illumination uniformity, lamps 708 are preferably positioned centered between the drum heads 706 of drum 700, and positioned with the filament axis of lamps 708 oriented parallel to the drum head surfaces.

Mounting brackets 710 are illustratively provided in FIG. 5 for supporting lamps 708. Lamp driver assemblies 712 are mounted on brackets 710, and brackets 710 are preferably adjustable to accommodate various size drums. Lamp driver assemblies 712 may preferably take the electrical form illustrated and described above with respect to FIG. 4. A circuit built in accordance with the present invention is illustrated at 714 as being mounted on drum 700. Circuitry 714 also includes a pick-up 724 (FIG. 6). Control wires 716 interconnect lamps 708 with circuitry 714. An operator control 718 is provided which corresponds generally to resistor R2 of FIG. 3.

A battery 720 is illustrated in FIG. 5 as being connected by a power cord 722 to drum 700. Battery 720 may be belt mounted with hooks, or sling mounted, using the shoulders of a drum player for support. In some cases, it may be preferable to mount battery 720 inside the drum itself. In any event, it is required that battery 720 take the form of a portable power source accordingly rendering the entire display apparatus of the present invention portable.

In this preferred application of the present invention, it is highly desirable to minimize or completely eliminate response of circuitry 714 to another drum or loud external sounds. It was discovered that the major mode of waves due to external noise is from side to side between drum heads 706 while expansions and compactions due to the striking of the drum heads 706 occurred throughout the inside of the drum 700. To minimize responding to the sympathetic waves, it is preferable that pick-up 724 be positioned at right angles to the drum's heads such that the receiving face of pick-up 724 is directed towards the opposite reflective surface 704. It is also preferable that pick-up 724 be vibrationally isolated, by properly choosing mounting means so as to minimize spurious outputs due to knocking about of the drum 700. Basically, the idea is to maximize the output response of pick-up 724 to normal impacts of the drum heads themselves, while minimizing the output response to all other disturbing sound and vibrational sources.

FIG. 6 illustrates the preferred orientation of pick-up 724. In FIG. 6 there is illustrated a drum comprising a cylindrical drum shell 730 having two open ends, drum heads 732 and 734 which are parallel positioned one on each side of drum shell 730, and a drum stick 736.

When drum stick 736 strikes drum head 732 at impact area 738, primary pressure waves 740 are established which reflect off drum shell 730 to create secondary pressure waves 742. In addition, externally generated sounds, such as from adjacent drums, close proximity hand clapping and loud noises as well as "normal" noise and vibrations induced by handling and carrying the drum also establish pressure waves inside drum shell 730. Accordingly, some form of "filter" is required that can effectively and economically permit separation of the pressure waves created by the drum stick 736 from those established by externally generated sounds. To provide this filter, pick-up 724 is shown in FIG. 6 as comprising an air operated transducer 744 mounted in a resilient member 746 which provides acoustical and mechanical isolation from drum shell 730. Transducer 744 is widthwise center mounted immediately adjacent to the inner wall of shell 730 with the maximum response direction of pick-up 724 positioned perpendicular to the walls of drum shell 730. Pick-up 724 may further include hollow tube 748 to enhance directivity response.

In this position, pick-up 724 is oriented to receive secondary pressure waves within drum shell 730 generated by the reflection of primary pressure waves of the inside wall of drum shell 730. The response of pick-up 724 thereby obtained to purposeful drum head impacts is not materially reduced, while the response to extraneously generated sounds is materially and beneficially reduced to tolerable levels. In addition, the currents involved passing through the wiring inductances and resistances result in transient as well as DC voltage drops, which manifest themselves as electrical noise on the supply lines, and cause unacceptable variations in light output intensities.

From the standpoint of good practices as well as necessity, these interfering fields and voltage drops must be minimized.

Furthermore, any wire scheme of the present invention must be capable of withstanding rather severe mechanical shock and vibrations as well as being exposed to quickly changing climatic conditions of heat, cold, and condensing moisture.

It must therefore be understood that components, wires and conductors could come lose, break, and/or oxidize to create high resistance or open circuits. Although periodic maintenance may find and fix these these occurrences, preferably before they actually happen, field failures while a device is in actual use must be minimized if the full benefit of the invention is to be obtained.

The total power supply and signal distribution system, including to and between lamp drivers, preferably utilizes twisted pairs of wires to minimize line inductance and thereby the corresponding radiative transient voltage drops. All wires should also be stranded, and wire-to-terminal connections should incorporate insulation supports.

Furthermore, protection against field failures due to the unnoticed development of bad conditions is maximized, in accordance with the present invention, by using a redundant method of wiring. Specifically, the present invention contemplates the employment of first and second conductive loops, with the light sources of the present invention being coupled in parallel to one another between the first and second loops, and the light sources of the present invention being coupled to each loop at individual nodes, with substantially equal resistance between adjacent nodes. The power supply, in accordance with the present invention, is preferably coupled to the first and second loops at respective first and second points, which first and second points lie at the ends, respectively, of current paths for each of the light sources, with each current path having substantially the same resistance.

A specific implementation of this arrangement is illustrated in FIG. 7 wherein resistances 800(a)–800(j) are coupled one to another at nodes 802 to provide a first loop 804. Resistances 800(a)–800(j) are in effect equal interconnection wiring resistances. In a similar manner, resistances 806(a)–806(j) are connected one to another at nodes 808 to form a second independent conductive loop 810. A plurality of lamp driver assemblies RL are coupled in parallel one to another between first loop 804 and second loop 810 and are coupled to each loop 804 and 810 respectively at individual nodes 802 and 808, with substantially equal resistances 800(a)–800(j) and 806(a)–806(j) between nodes 802 and 808, respectively.

A power supply 812 is illustrated in FIG. 7 coupled between first loop 804 and second loop 810. Specifically, power supply 812 is coupled to first loop 804 at point 814 and is coupled to second loop 810 at point 816. Points 814 and 816 are carefully chosen to lie at the ends, respectively, of current paths for each of assemblies RL with each current path having substantially the same resistance. Specifically, regardless of which lamp driver assembly RL is considered, the current path comprises five times the individual resistance RS of the resistors 800(a)–800(j) and 806(a)–806(j). In other words, points 814 and 816 are chosen 180 degrees away from each other in loops 804 and 810, respectively.

Utilizing the wiring configuration of FIG. 7, the voltage distribution to lamp driver assemblies RL is maximized. Furthermore, there is a secondary current path provided by this arrangement for each lamp driver assembly, which increases the overall reliability of the system.

In FIG. 8 there is illustrated a block diagram of another example of a display apparatus incorporating the teachings of the present invention. The apparatus of FIG. 8 comprises a standard input transducer 900 having an audio output coupled to the input of a standard variable gain amplifier 902. The operation of variable gain amplifier 902 is shown governed by a remote sensitivity control 904. The output of variable gain amplifier 902 is coupled to a peak detector 906 that provides an output which is a function of the instantaneous peaks of an input audio signal detected by transducer 900.

The output of peak detector 906 is coupled to the input of voltage-to-frequency converter 908. As is well-known to those skilled in the art, voltage to frequency converter 908 provides an output having a frequency which is dependent upon the amplitude of the input voltage. Variable frequency output from voltage to frequency converter 908 is coupled to pulse former 910, whereas the output of pulse former 910 is coupled through predriver 912 to a plurality of lamps 914. Pulse former 910 includes circuitry for forming pre-bias pulses as described above for warming lamps 914.

FIG. 9 illustrates a number of waveforms corresponding to the power output of pre-driver 912 for various amplitude signals received at input transducer 900. Waveform K represents a continuous ON signal from pre-driver 912 to lamps 914 when a maximum amplitude audio signal is received, whereas waveform O represents only pre-biasing pulses being transmitted to lamps 914 when a minimum audio signal is received at transducer 900. Waveforms L, M and N are representative samples of other possible resultant power outputs to lamps 914 for various audio input signals between a maximum and minimum. Thus, the circuit of FIG. 8 provides a fixed pulse width, variable repetition rate system built in accordance with the teachings of the present invention.

Although the primary intended use of the present invention is for marching percussion sections in bands across the nation, there are a multiplicity of other possible applicables. Thus, although initially conceived and designed for percussion instruments in a self-displayed mode, the system of the present invention may also be utilized with wind instruments, and a visual display can be remotely located.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or scope of applicant's general inventive concept.

I claim:

1. A display apparatus responsive to an audio signal comprising:
   (a) a light source having a variable resistance, said resistance having an initial value when said light source is cold and a larger value when said light source is warm;
   (b) modulator means responsive to said audio signal for controlling the illumination of said light source; and
   (c) circuit means, including a pulse generator means for periodically passing pulses of current through said light source, for warming said light source prior to said illumination of said light source by said modulator means sufficient to increase said resistance above said initial value.

2. The display apparatus of claim 1 wherein said pulses of current are of sufficiently short duration to preclude visually discernable illumination of said light source by a viewing audience.

3. The display apparatus of claims 1 or 2 wherein said circuit means is activated by said audio signal.

4. The display apparatus of claims 1 or 2 wherein said modulator means is responsive to the amplitude of said audio signal.

5. A display apparatus responsive to an audio signal comprising:
   (a) a light source having a variable resistance, said resistance having an initial value when said light source is cold and a larger value when said light source is warm;
   (b) modulator means responsive to the amplitude of said audio signal for controlling the illumination of said light source, said modulator means including:
      (i) a signal generator providing a variable reference signal;
      (ii) detector means for providing an audio peak signal which varies as a function of the peak amplitudes of said audio signal; and
      (iii) comparator means responsive to the instantaneous relative amplitudes of said variable reference signal and said audio peak signal for driving said light source; and
   (c) circuit means for warming said light source prior to said illumination of said light source by said modulator means sufficient to increase said resistance above said initial value.

6. The display apparatus of claim 5 wherein said circuit means includes a pulse generator means for periodically passing pulses of current through said light source.

7. The display apparatus of claim 6 wherein said pulses of current are of sufficiently short duration to preclude visually discernable illumination of said light source by a viewing audience.

8. The display apparatus of claims 5, 6, or 7 wherein said circuit means is activated by said audio signal.

9. A display apparatus comprising:
   (a) a drum;
   (b) an incandescent light source mounted on said drum and having an initial value resistance when said light source is cold;
   (c) modulator means mounted on said drum and responsive to playing of said drum for controlling the illumination of said light source;
   (d) circuit means mounted on said drum for decreasing the initial current draw of said light source upon illumination of said light source in response to said modulator means by increasing said resistance of said light source above said initial value prior to said illumination of said light source; and
   (e) a portable power source of said light source, modulator means, and circuit means to render said display apparatus portable.

10. The display apparatus of claim 9 wherein said modulator means includes an air pressure actuated transducer.

11. The display apparatus of claim 9 wherein said drum comprises a cylindrical drum shell having two open ends and two drum heads parallel positioned, one on each of said drum shell; and wherein said modulator means includes a pick-up having a maximum response direction, said pick-up mounted on the inside wall of said drum shell with said maximum response direction oriented to receive secondary pressure waves within said drum shell generated by the reflection of primary pressure waves off the inside wall of said drum shell.

12. The display apparatus of claims 1, 5 or 9 further including a plurality of said light sources.

13. The display apparatus of claim 12 further including:
   (a) first and second conductive loops, said light sources being coupled in parallel to one another between said first and second loops and coupled to each loop at individual nodes with substantially equal resistance between each of said nodes; and (b) a power supply coupled to said first and second loops at respective first and second points, which first and second points lie at the ends, respectively, of current paths for each of said light sources, with each current path having substantially the same resistance.

* * * * *